United States Patent [19]

Boutet et al.

[11] Patent Number: 5,140,160

[45] Date of Patent: Aug. 18, 1992

[54] COLLECTOR FOR STORAGE PHOSPHOR IMAGING SYSTEM

[75] Inventors: John C. Boutet, Rochester; Bruce R. Whiting, Pittsford; Michael B. Brandt, Walworth, all of N.Y.

[73] Assignee: Eastman Kodak Company, Rochester, N.Y.

[21] Appl. No.: 796,484

[22] Filed: Nov. 22, 1991

[51] Int. Cl.⁵ .......................................... G01N 23/04
[52] U.S. Cl. ............................. 250/327.2; 250/484.1
[58] Field of Search ............ 250/327.2, 484.1, 227.26; 359/861

[56] References Cited

U.S. PATENT DOCUMENTS

| | | | |
|---|---|---|---|
| Re. 31,847 | 3/1985 | Luckey | 250/327.2 |
| 4,346,295 | 8/1982 | Tanaka et al. | 250/327.2 |
| 4,743,758 | 5/1988 | Chan et al. | 250/327.2 F |
| 4,743,759 | 5/1988 | Boutet | 250/327.2 |

Primary Examiner—Carolyn E. Fields
Attorney, Agent, or Firm—William F. Noval

[57] ABSTRACT

A light collector for collecting and detecting light emitted by, reflected from, or transmitted through a scanned information medium. The collector includes a planar mirror and side by side pyramidal mirrors which collect light and direct it to a photodetector located at a centrally located aperture in the planar mirror. The collector preferably collects light emitted by a storage phosphor which has been stimulated by stimulating light passed through aligned slots in the collector.

6 Claims, 2 Drawing Sheets

COLLECTOR FOR STORAGE PHOSPHOR IMAGING SYSTEM

BACKGROUND OF THE INVENTION

1. Field of Invention

The invention relates in general to apparatus for reading out the image stored in a storage phosphor, also known as a stimulable phosphor. More particularly, this invention relates to apparatus for collecting and detecting the radiation emitted from the storage phosphor in response to interrogation by stimulating radiation.

2. Background Art

In a storage phosphor imaging system, as described in U.S. Pat. No. 31,847, reissued Mar. 12, 1985 to Luckey, a photostimulable storage phosphor is exposed to an image-wise pattern of short wavelength radiation, such as x-ray radiation, to record a latent image pattern in the storage phosphor. The latent image is read out by stimulating the phosphor with a relatively long wavelength stimulating radiation, such as red or infrared light. Upon stimulation, the storage phosphor releases emitted radiation of an intermediate wavelength, such as blue or violet light, in proportion to the quantity of short wavelength radiation that was received. To produce a signal useful in electronic image processing, the storage phosphor is scanned in a raster pattern by a beam of light produced, for example, by a laser deflected by an oscillating or rotating scanning mirror. The emitted radiation from the storage phosphor is sensed by a photodetector, such as a photomultiplier tube, to produce electronic image signals.

In one type of scanning apparatus, the storage phosphor is placed on a translation stage and is translated in a page scan direction past a laser beam that is repeatedly deflected in a line scan direction to form a scanning raster.

To optimize the signal-to-noise ratio of the imaging system, it is desirable to collect as much of the emitted light as possible and to direct it to the photodetector. One form of light collector is proposed in U.S. Pat. No. 4,346,295, issued Aug. 24, 1982 to Tanaka et al. The light collector proposed by Tanaka includes a light guide member comprising a sheet of light transmitting material that is flat on one end and rolled into an annular shape on the opposite end. The flat end of the light collector is positioned adjacent to the scan line on the storage phosphor. The light receiving face of a photo multiplier tube is placed against the annular end of the light guiding member. Such a light collection system has the disadvantages of being expensive and inherently complicated to manufacture. Furthermore, the collection efficiency of transparent light guide members is limited due to their absorption in the wavelength range of light emitted by storage phosphors.

In order to provide an easily manufacturable, low cost, high efficiency light collector, one of the present inventors proposed a double roof mirror light collector in U.S. Pat. No. 4,743,759, issued May 10, 1988, inventor John C. Boutet. As disclosed in this patent, a light collector for collecting and detecting light emitted from a storage phosphor in a photostimulable phosphor imaging system, includes a roof mirror light collector having a bottom roof mirror extending the width of the storage phosphor and a top roof mirror positioned over the bottom roof mirror to define a mirror box having a nearly square cross-section. The roof mirrors define slots along their peaks for passing a scanning beam stimulating radiation through the light box to the surface of the photostimulable phosphor sheet and for admitting emitted light from the storage phosphor into the light box. A photodetector is positioned at each end of the light box to convert collected light into an electronic signal representative of the latent image stored in the phosphor sheet. FIG. 13 of the above-mentioned patent, discloses a light collector which tapers from one end to the other with a light detector at the large end of the collector. In the latter configuration, if a large photo-multiplier tube having a convex face is used, the convex surface will interfere with the stimulating radiation scanning beam.

SUMMARY OF THE INVENTION

According to the present invention, there is provided a light collector for collecting and detecting light emitted by, reflected from, or transmitted through an information medium such as a storage phosphor which stores a latent x-ray image. The collector has high light collection efficiency due to its large cone angle and minimization of the number of reflections before light is directed to a photodetector which reduces light reflection loss. The collector is compact and easily manufacturable since it is formed from planar mirrors and has a single photodetector which does not project beyond the side or top of the collector.

According to a feature of the present invention, a light collector includes a planar mirror and side-by-side pyramidal mirrors facing the planar mirror. The mirrors extend the width of a scanned information medium such as a storage phosphor. A photodetector has a face coextensive with a centrally located aperture in the planar mirror.

DESCRIPTION OF THE PREFERRED EMBODIMENTS

Figure 1:
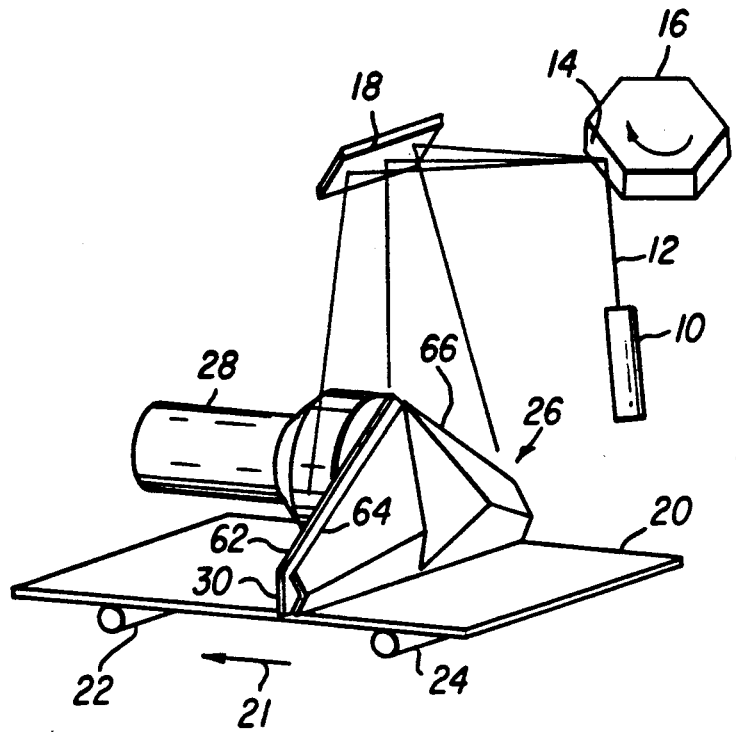
FIG. 1 is a perspective view showing a storage phosphor imaging system including an embodiment of the present invention.

Referring now to FIGS. 1-5, there will be described an embodiment of the collector of the present invention as incorporated in a storage phosphor imaging system. It will be understood that the present invention can be used in other light collecting applications (such as film digitizers) where a light is transmitted, reflected or emitted from an information (image) medium. As shown in FIG. 1, a laser 10 produces a laser beam 12 which is reflected from a mirror 14 of rotating polygon scanner 16. The laser beam 12 is deflected by mirror 18 to sweep it across a storage phosphor 20 as it is transported in direction 21 by rollers 22, 24.

Storage phosphor 20 stores a latent x-ray image such as of an anatomical part of a patient. Storage phosphor 20 is scanned in a raster pattern by the coordinated movement (1) of the scanning laser beam 12 across the width of storage phosphor 20, and (2) of the movement of phosphor 20 in the direction of arrow 21 under the scanning beam 12. Storage phosphor 20 may take the form of a sheet or plate, as shown, or of a belt or drum.

The storage phosphor 20 emits light at a wavelength different from the wavelength of the stimulating light of laser beam 12. For example, laser 10 emits red light and storage phosphor 20 emits blue light. The intensity of light emitted by storage phosphor 20 is a function of the latent x-ray image stored in storage phosphor 20.

Figure 2:
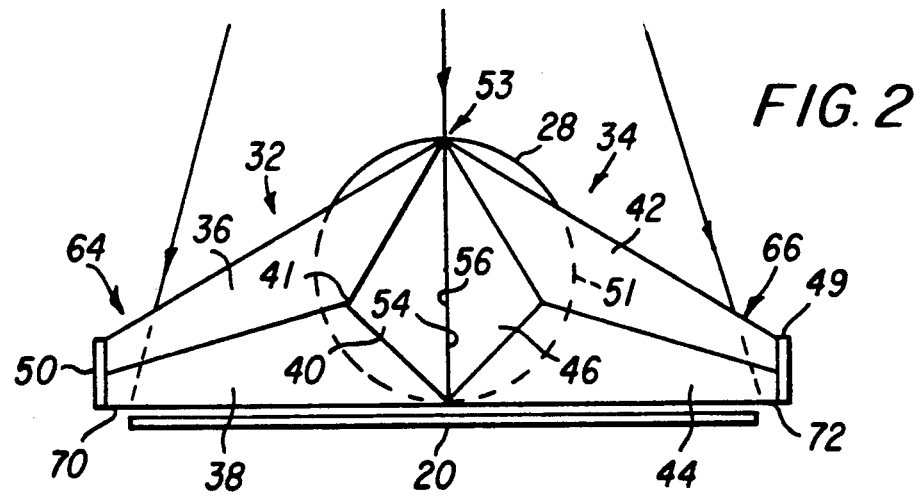
FIGS. 2, 3 and 4 are respective front elevation, side elevation and top plan views of the embodiment of FIG. 1.
Figure 4:
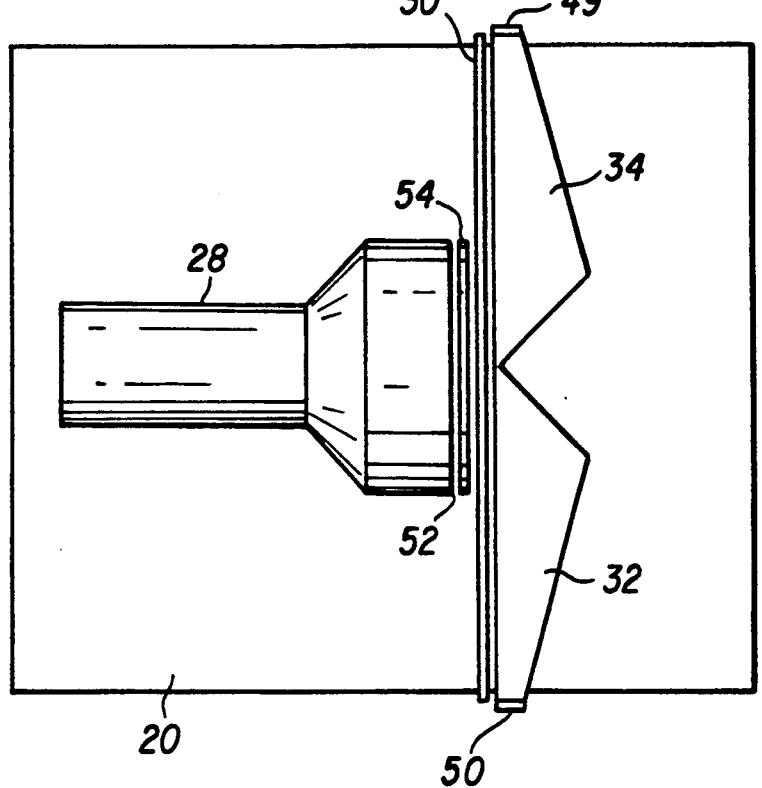

According to the present invention, the emitted light is collected by collector 26 and detected by photodetector 28. Collector 26 includes a planar mirror 30 extending the width of storage phosphor 20 and disposed substantially perpendicular thereto. Collector 26 also includes side-by-side pyramidal mirrors 32 and 34 facing planar mirror 30 (FIG. 4). Pyramidal mirror 32 includes upper mirror 36, lower mirror 38 and side mirror 40, forming an apex 41 (FIG. 2). Pyramidal mirror 34 includes upper mirror 42, lower mirror 44 and side mirror 46, forming an apex 48. End mirrors 49 and 50 may be used to reduce efficiency drop-offs at the end of the scan line. Mirrors 36, 38, 40, 42, 44, 46, 49 and 50 are preferably planar mirrors.

Figure 5:
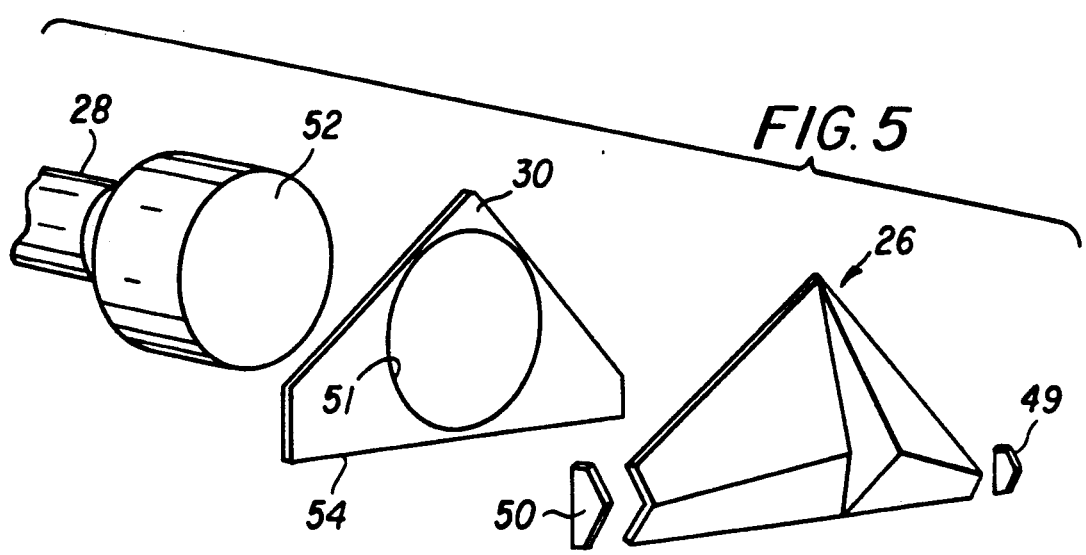
FIG. 5 is an exploded perspective view of the embodiment of FIG. 1.

Planar mirror 30 has a centrally located aperture 51 (FIG. 5). Photodetector 28 (such as a photo multiplier tube) has a light receiving face 52 coextensive with aperture 51. A filter 54 which only passes emitted light is placed over face 52.

Figure 3:
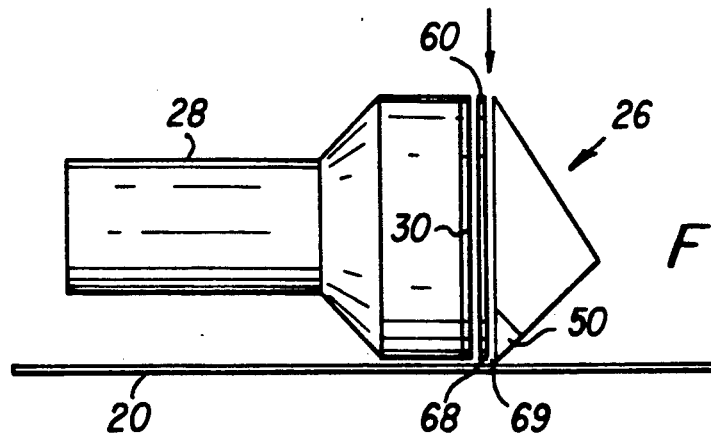

Mirror 30 has an upper edge 60 which forms an upper slot 62 with upper edges 64 and 66, respectively, of pyramidal mirrors 32, 34 (FIG. 1). Mirror 30 has a lower edge 68 which forms a lower slot 69 with lower edges 70 and 72, respectively, of pyramidal mirrors 32, 34 (FIGS. 2 and 3). The stimulating light laser beam 12 passes through slots 60, 69 to stimulate storage phosphor 20. Light emitted by storage phosphor 20 passes into collector 26 through lower slot 69.

Preferably, one or more of mirrors 30, 36, 38, 40, 42, 44, 46 (FIG. 2) selectively reflects emitted light to reduce flare caused by reflected stimulating light from the surface of phosphor 20 reimpinging on the phosphor elsewhere and causing uncorrelated secondary emission. If mirror 30 is used for filtering out reflected stimulating light, it may be combined with the filter 54. In this design, as shown in FIG. 5, a large pentagon shaped filter is selectively aluminized on the photodetector side of the filter glass to provide aperture 51 in the aluminizing, filter mirror 30 and filter 54 as one part.

The collector of the present invention has excellent emitted light collection efficiency due to increased cone angle and reduced light reflection loss. Moreover, light emitted on one side of the phosphor 20 will not be reflected to the other side because of side deflection mirrors 40 and 46, respectively, of pyramidal mirrors 32 and 34. Thus, light emitted on the right side (as seen in FIG. 2) of the median region 53 formed by the contiguous edges 54 and 56 of side mirrors 40, 46, respectively, will be reflected by pyramidal mirror 34 to the right side of photodetector 28. Similarly, light emitted on the left side of the median region 53 will be reflected by pyramidal mirror 32 to the left side of photodetector 28. The number of internal reflections of a ray of emitted light before it reaches photodetector 28 is minimized, reducing reflection loss and increasing emitted light collection efficiency.

INDUSTRIAL APPLICATION

The light collector of the present invention finds application in the medical diagnostic field, such as in digital radiography in which an x-ray of a patient's anatomical part is stored in a storage phosphor which is read out as a digital x-ray image.

Although this invention has been described with reference to preferred embodiments thereof, it will be understood that variations and modifications can be effected within the spirit and scope of the invention as described above and as defined in the appended claims.

What is claimed is:

1. A light collector for and detector collecting and detecting light emitted, reflected or transmitted by a scanned information medium comprising:

a planar mirror for extending the width of a scanned information medium and for disposition substantially perpendicular thereto, said planar mirror having a lower edge for placement adjacent to the scanned medium and an upper edge spaced from the lower edge and having a centrally located aperture;

first and second pyramidal mirrors located side by side facing said planar mirror, said pyramidal mirrors having respective upper edges spaced from said upper edge of said planar mirror and respective lower edges spaced from said lower edge of said planar mirror, thereby to form aligned slots for the passage of a scanning beam of radiation to a medium to be scanned and for allowing light emitted, reflected or transmitted by the scanned medium to enter the collector; and photodetector means having a light receiving face coextensive with said aperture in said planar mirror for receiving light from said scanned medium and reflected by said collector and for generating an electrical signal in response thereto.

2. The collector and detector of claim 1 wherein, in use, said collector is located adjacent to a storage phosphor and wherein a scanning beam of stimulating light is passed through said upper and lower slots of said collector to said storage phosphor and light emitted by said storage phosphor passes through said lower slot into said collector, and including a filter over the face of said photodetector means for only passing emitted light, but not stimulating light to said photodetector means.

3. The collector and detector of claim 2 wherein at least one of said planar and said first and second pyramidal mirrors selectively reflects emitted light.

4. The collector and detector of claim 3 wherein the planar selectively reflecting mirror is combined with said photodetector means filter by providing a photodetector means aperture in the aluminized coating applied to the photodetector means side of a planar mirror shaped filter glass plate.

5. The collector and detector of claim 1 wherein said first and second pyramidal mirrors respectively include upper, lower and side mirrors forming an apex facing said planar mirror, said side mirrors of said first and second pyramidal mirrors having contiguous edges extending medially of said photodetector means.

6. The collector and detector of claim 5 wherein the upper, lower and side mirrors of said first and second pyramidal mirrors are planar mirrors.

* * * * *